(No Model.) 2 Sheets—Sheet 1.
D. FINE.
SPRAYING MACHINE.
No. 596,061. Patented Dec. 28, 1897.
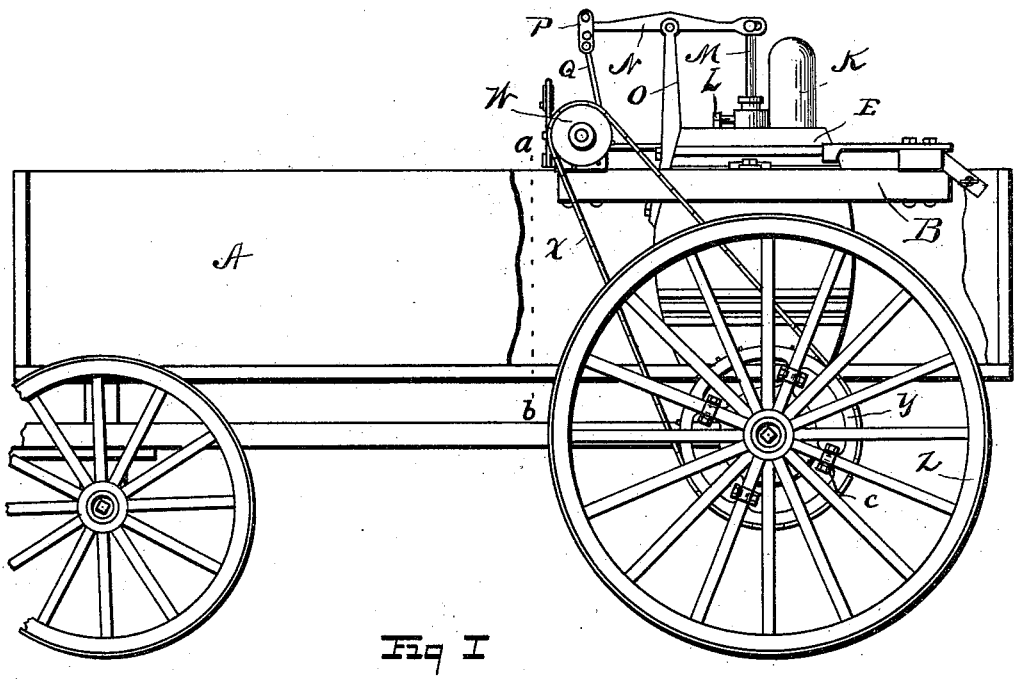
Fig I
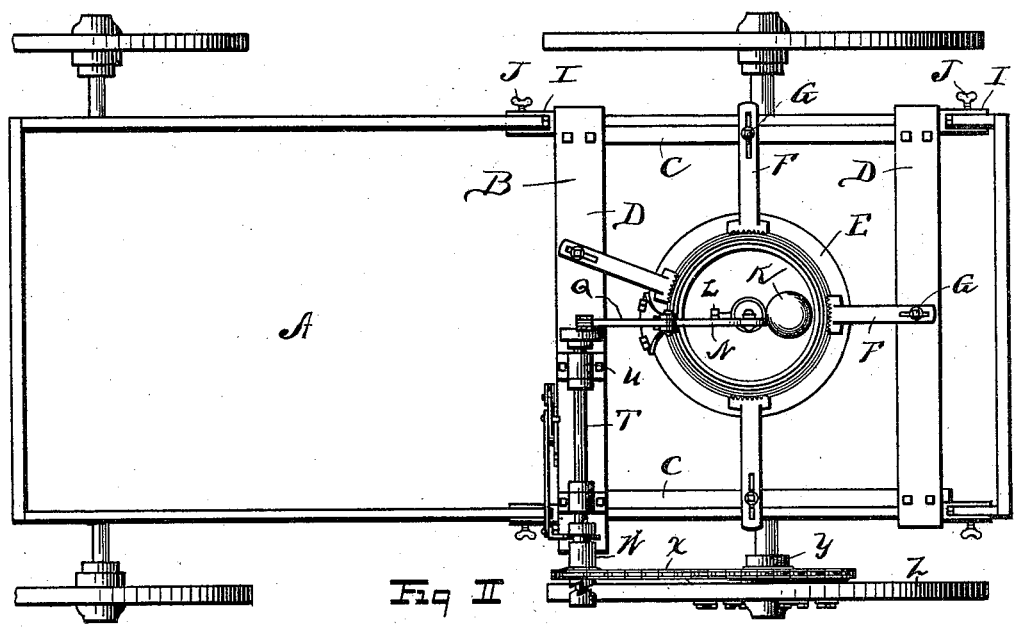
Fig II
WITNESSES: Douglas Fine, INVENTOR,
BY
Warren D. House,
ATTORNEY.

(No Model.) 2 Sheets—Sheet 2.
D. FINE.
SPRAYING MACHINE.
No. 596,061. Patented Dec. 28, 1897
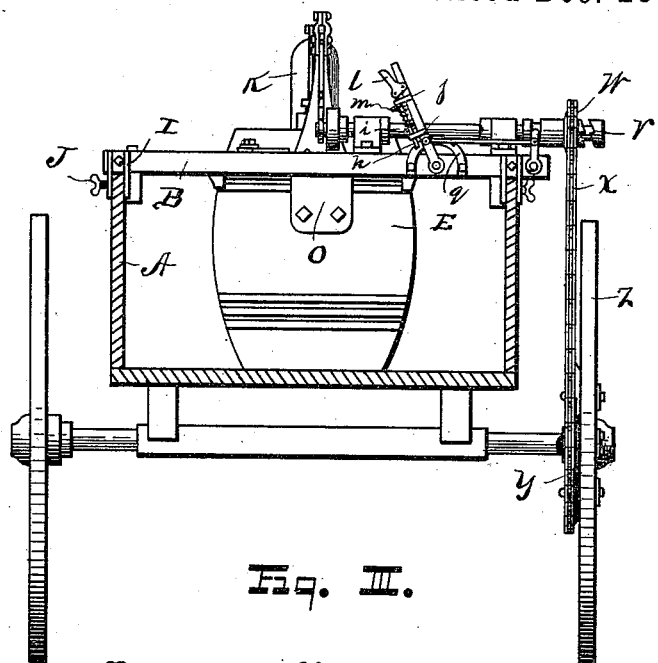
Fig. III.
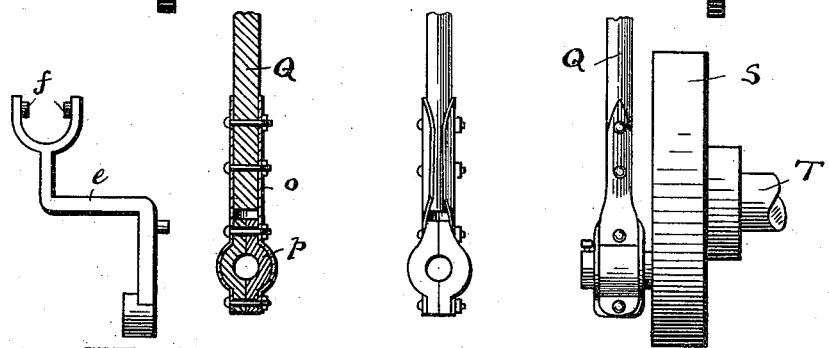
Fig. IV. Fig. V. Fig. VI. Fig. VII.
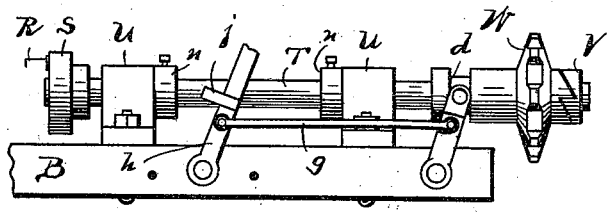
Fig. VIII.
WITNESSES: Douglas Fine, INVENTOR,
BY Warren D. House.
HIS ATTORNEY.

UNITED STATES PATENT OFFICE.

DOUGLAS FINE, OF SIAM, IOWA.

SPRAYING-MACHINE.

SPECIFICATION forming part of Letters Patent No. 596,061, dated December 28, 1897.

Application filed July 13, 1896. Serial No. 598,923. (No model.)

*To all whom it may concern:*

Be it known that I, DOUGLAS FINE, a citizen of the United States, residing at Siam, in the county of Taylor and State of Iowa, have invented certain new and useful Improvements in Spraying-Machines, of which the following is a specification, reference being had therein to the accompanying drawings.

My invention relates to improvements in spraying mechanism.

The object of my invention is to provide a spraying-machine which may be carried upon an ordinary wagon or other wheeled vehicle and which is operated by means of gearing driven by one of the wagon-wheels.

My invention consists substantially in a pump which is mounted upon a receptacle that contains the spraying liquid, the receptacle being secured in the wagon-box, combined with mechanism, hereinafter described, by means of which the revolving of the vehicle-wheel is made to operate the pump for the purpose of distributing the liquid contained in the receptacle over trees, shrubbery, or other plants. The liquid contained in the receptacle and which is used for spraying purposes is an insecticide mixture which kills bugs, worms, and other insects and prevents the formation of fungoid growths.

My invention consists, further, in certain peculiarities of construction, hereinafter fully described and claimed.

Referring to the accompanying drawings, which illustrate my invention, Figure 1 represents a side elevation, a portion of the wagon-box on one side being broken away in order to better show some of the parts. Fig. 2 represents a plan view. Fig. 3 represents a transverse vertical section taken on the dotted line *a b* of Fig. 1. Fig. 4 represents a detail view of the arm *e*. Fig. 5 represents a longitudinal sectional view of the driving-rod Q and some of the parts connected with it. Fig. 6 represents a side elevation of what is shown in Fig. 5. Fig. 7 represents a front elevation of the crank-disk S and the lower end of the driving-rod Q. Fig. 8 represents a front elevation of the driving-shaft T and some of the parts connected with it.

Similar letters of reference indicate similar parts throughout the drawings.

A indicates the wagon-box, to the upper side of which, near the rear end, is secured a rectangular frame B, which consists of two parallel transverse strips D, secured at their ends to two strips C, which are parallel to and located within the sides of the wagon-box.

E represents a receptacle, the most desirable form being that of a barrel which is adapted to contain an insecticide liquid. The barrel E rests upon the bottom of the wagon-box and is held securely in place by means of the plates F, which are arranged around the barrel, their inner ends being provided with a row of transverse serrations, so as to better hold the barrel-staves, and their outer ends being held securely to the upper side of the frame B by means of the bolts G, which pass through longitudinal slots, one in each outer end of each of the plates F. At each corner of the frame B is secured a U-shaped clamping-plate I, the arms of which embrace the upper edge of the top board on each side of the wagon-box. Each outer arm of each of the plates I is provided with a transverse screw-threaded opening into which is fitted a set-screw J, which is adapted to screw into or against the wagon-box for the purpose of preventing lengthwise movement of the frame B upon the top of the wagon-box.

K indicates a pump which may be of any desirable style suitable for the purpose and which is rigidly secured to the upper end of the barrel E.

L indicates a coupling to which may be attached the hose which is to be used for spraying.

M indicates the pump piston-rod.

N indicates a pump-handle, which may be of any desirable form and which is pivotally connected to the upper end of a supporting-plate O, the lower end of which is rigidly secured to the barrel E. The forward end of the pump-handle N is connected to the piston-rod M, and the rear end of the pump-handle is rigidly clamped between two plates P by means of two bolts, one located above and the other below the pump-handle and the ends of which are secured, respectively, to the two plates P. Pivoted between the lower ends of the plates P is the upper end of a driving-rod Q, the lower end of which is located between and is rigidly secured to the upper ends of two clamping-plates o, the lower ends of which have clamped between them the boxing p, in which is mounted the crank-pin R, which is secured upon the outer face of the crank-disk S, which in turn is rigidly secured upon a transverse shaft T at its left end, as viewed from the front part of the wagon. The shaft T is revolubly mounted in bearings U, which are secured upon the upper surface of the front strip D of the frame B. Rigidly secured upon the outer end of the shaft T, which extends over the side of the wagon-box, is a toothed clutch V. Outside of the wagon-box and to the left of the clutch V, as viewed from the front, a sprocket-wheel W is revolubly mounted upon the shaft T. A sprocket-chain X connects the sprocket-wheel W and a sprocket-wheel Y, the latter being secured by means of the clamping-plates c, which are bolted to the said sprocket-wheel and embrace the spokes of one of the wagon-wheels Z. The sprocket-wheel W is longitudinally movable upon the shaft T and is provided with an elongated hub at its left end in which is a peripheral groove d. A hub is also provided upon the opposite side of the sprocket-wheel W and has provided in its end serrations or teeth corresponding to and adapted to engage with the serrations of the clutch V at such times as the sprocket-wheel is moved to the extreme right.

In order to engage or disengage the sprocket-wheel W with the clutch V, I provide mechanism by which the sprocket-wheel is longitudinally movable upon the shaft T. This mechanism consists in the following parts: A vertical arm e, the lower end of which is pivoted to the front side of the forward strip D, is bent inwardly and then upwardly, so as to have its upper end below the shaft T. The upper end of the arm e is bifurcated and embraces the grooved part d of the hub of the sprocket-wheel W. A horizontal rod g has one end pivoted to the arm e and the other end pivoted to the lever h, the lower end of which is pivoted to the strip D in the front part of the frame B. To one side of the lever h are secured projections j, which are provided with openings in which is movably fitted a rod k, which is parallel to the lever h and is pivotally connected at its upper end to a bell-crank lever l, which in turn is pivoted to the lever h. Between the two projections j and in the rod k is secured a pin i. Encircling the rod k, between the pin i and the upper projection j, is a coil-spring m, the tension of which is such as will force the rod k downward, so that the lower end of the said rod k may enter one of two notches located in an arc-shaped strap q, which is secured to the front side of the forward strip D. Between the bearings U and located one adjacent to each of the said bearings, respectively, are two collars n, which are secured upon the shaft T for the purpose of preventing longitudinal movement of the shaft. The inner sides of each of the arms of the bifurcated upper end of the arm e is provided with an inwardly-extending cylindrical projection f, adapted to operate within the groove d in the sprocket-wheel W.

My invention is operated as follows: The parts having been assembled as described above the barrel is then filled with the liquid to be utilized in spraying. A hose which is provided with the style of nozzle desired is then attached to the coupling L of the pump K, and the wagon is drawn around where it is desired to do the spraying. The revolving of the wagon-wheel Z causes a rotation of the shaft T when the sprocket-wheel W is in the proper position or engaged with the clutch V. The rotation of the shaft T causes a reciprocating movement of the driving-rod Q, which in turn imparts a reciprocatory movement to the pump-handle N, thus forcing the water in the ordinary manner from the barrel by means of the pump. The style of pump used may be varied to suit, a force-pump of the ordinary construction being a desirable form. When it is desired to stop the working of the pump, the lever h is thrown to the left as viewed from the front, thus withdrawing the sprocket W from engagement with the clutch V and stopping the rotation of the shaft T.

In the construction I have shown the frame B may be moved to any portion of the top of the wagon-box and secured in such position. This may be done for the purpose of tightening or loosening the tension of the sprocket-chain X or for any other desired reason. By varying the relative size of the sprocket-wheels W and Y the speed of the rotation of the shaft T may be whatever is desired.

In the construction shown illustrating the manner of securing the barrel in place any desired adjustment in position of the barrel may be attained.

Many modifications in construction may be made without departing from the spirit of my invention.

Having thus described my invention, what I claim, and desire to secure by Letters Patent, is—

1. In a spraying-machine, the combination with a wagon-box, of a frame carried by the wagon-box, a barrel for holding the insecticide fluid located within the said frame, and inwardly and outwardly adjustable arms secured to the frame and engaging the barrel for preventing lateral movement thereof, substantially as described.

2. In a spraying-machine, the combination with the wagon-box, of a horizontal frame secured to the upper side thereof, a barrel for holding the insecticide fluid located within the said frame, and arms the inner ends of which are serrated and engage the periphery of the barrel and the outer ends of which are secured to the said frame, substantially as described.

3. In a spraying-machine, the combination with the wagon-box of the frame B secured thereto, the barrel for carrying the insecticide fluid located within the frame B, the adjustable arms F secured to the frame B and engaging the barrel, a pump for ejecting the liquid from the barrel, and mechanism connecting the pump with the running-gear of the wagon for operating the pump, substantially as described.

4. In a spraying-machine, the combination with the wagon-box, of a receptacle for carrying insecticide fluid, arms for engaging the receptacle adjustable toward and from the same, means for supporting the arms from the wagon-box, a pump for ejecting the fluid from the receptacle, and mechanism connecting the pump with the running-gear of the wagon for operating the pump, substantially as described.

In testimony whereof I affix my signature in presence of two witnesses.

DOUGLAS FINE.

Witnesses:
A. B. ROUSH,
FRANK ROUSH.